United States Patent [19]

Troyer et al.

[11] Patent Number: 5,192,948
[45] Date of Patent: Mar. 9, 1993

[54] GEOPHONE BOREHOLE CABLE

[75] Inventors: William H. Troyer, Colleyville; Victor L. Schoepf, Carrollton, both of Tex.

[73] Assignee: Mobil Oil Corporation, Fairfax, Va.

[21] Appl. No.: 787,469

[22] Filed: Nov. 4, 1991

[51] Int. Cl.$^5$ ............................................. G01V 1/00
[52] U.S. Cl. ............................ 340/855.1; 340/854.9; 367/912; 367/154; 367/178; 174/126.3
[58] Field of Search ................ 181/102, 104, 112; 174/705, 101.5, 102 D, 126.3, DIG. 8; 340/854.9, 855.1; 367/20, 25, 153, 154, 911, 912, 178, 188; 178/63 R; 138/173; 114/253

[56] References Cited

U.S. PATENT DOCUMENTS

| | | | |
|---|---|---|---|
| 2,890,263 | 6/1959 | Brandes et al. | 174/102 D |
| 3,872,233 | 3/1975 | Rocton | 174/70 S X |
| 3,980,807 | 9/1976 | Woytiuk | 174/102 D X |
| 4,295,212 | 10/1981 | Swenson | 367/20 |
| 4,491,939 | 1/1985 | Carpenter | 367/20 |
| 4,521,642 | 6/1985 | Vives | 174/70 S |
| 4,595,431 | 6/1986 | Bohannon, Jr. et al. | 174/102 D |
| 4,597,065 | 6/1986 | Lien et al. | 367/20 |
| 4,868,565 | 9/1989 | Mettes et al. | 340/856 |
| 5,062,084 | 10/1991 | Schoepf et al. | 340/858 |
| 5,111,903 | 5/1992 | Meynier | 181/102 |

Primary Examiner—Brian S. Steinberger
Attorney, Agent, or Firm—Alexander J. McKillop; Charles J. Speciale; George W. Hager, Jr.

[57] ABSTRACT

A borehole cable includes a plurality of geophone-containing modules spaced apart along the cable by a plurality of conduit sections and designed for acoustic, thermal and pressure imaging of the subsurface. Each cable conduit section comprises an inner core of flexible tubing and an outer wall of interlock completely surrounding the core. The inner corrugated core is designed to compress under the external pressure applied by the formation in which it is deployed. The percent of core compression is controlled by adjusting the composition and structure of the inner core and the outer interlock wall. Compression of the inner core beyond a predetermined limit causes the interlock to form a rigid outer wall preventing further compression. The pressure at which the inner core begins to compress and the percent of compression at which the outer wall locks is determined by their material composition, wall thickness and pre-compression during manufacturing.

34 Claims, 9 Drawing Sheets

GEOPHONE BOREHOLE CABLE

BACKGROUND OF THE INVENTION

The present invention relates primarily to the acquisition of subsurface acoustic data with a borehole geophone cable and in one of its preferred aspects relates to a receiver system especially useful in seismic tomography. The cable has additional facilities for recording detailed subsurface pressure and temperature data which is required to interpret the acoustic data.

Cross-borehole seismic tomography is currently being used as a method for subsurface characterization and monitoring changes within subterranean formations. For example, seismic tomographic imaging has been used to monitor the movement of thermal fronts through reservoirs in enhanced oil recovery projects, and the results from these surveys indicate that the tomographically-processed, cross-borehole data can image the velocity of the reservoir. Comparison of time sequential images can then be used to determine changes in the physical properties of the formation as a function of time and the recovery processes. Tomographic data is acquired by placing a seismic source in a "source" borehole and a seismic receiver in a "receiver" borehole, both of which penetrate the section of the formation to be imaged. The energy source is "fired" to generate acoustical energy which propagates through the formation and is recorded at the receiver borehole. The time required for the energy to propagate between the boreholes is dependent on the path along which the energy traveled. By positioning the source and receivers at different depths in their respective boreholes, a large number of different "travel paths" can be sampled and recorded. This information can be processed into a cross-sectional tomographic image of the section of the formation bounded by the two boreholes.

Typical receiver systems have been comprised of a plurality of three-component geophones located at spaced-apart positions along a borehole cable, either suspended in the borehole or installed directly in the subsurface. While numerous configurations of borehole cables have been employed in carrying out such tomographic surveys in moderate environments, it is the specific object of the present invention to provide a borehole cable that is capable of operating at pressures greater than 10,000 psi and temperatures greater than 450° F. in permanent installations.

SUMMARY OF THE INVENTION

In accordance with the present invention, there is provided a borehole cable having a plurality of modules, designed to record acoustic, thermal and pressure data, interconnected at spaced-apart intervals by special conduit and ancillary suspension modules. Each conduit is comprised of an inner core of mechanically pre-compressed flexible corrugated tubing and an outer wall of flexible interlock completely surrounding the inner core. The inner corrugated core is designed for additional, controlled compression under the external pressure applied by the formation in which it is deployed. Controlled compression is required to strengthen the inner core and ensure consistent separation of the geophone modules in retrievable installations, where the cable is not banded to a borehole casing or rigid structure.

Compression of the inner core beyond a preset limit causes the interlock to form a rigid outer wall preventing further compression. The pressure at which the inner core begins to compress and the percent of compression at which the outer wall locks are determined during manufacturing by adjusting the composition and structure of both the inner core and the outer interlock wall. Balancing these design elements optimizes the weight and strength of the cable assembly along its length. The result is an easily transported light, flexible assembly at surface conditions, and an extremely strong, rigid assembly at subsurface pressures and temperatures.

In a further aspect, the inner core is filled with inert gases to provide a stable atmosphere for internal cable components, or filled with high temperature resistant fluids such as synthetic oil to provide both a stable environment for internal components and internal pressure to counter the externally applied formation pressure. This later embodiment increases the pressure capabilities of the conduit and permits a greater range of materials to be used for the inner core. Valving and electrical sensors in the plurality of modules permit fluids to be injected into the inner core at the time of deployment, and then monitored during operation. Similar facilities in the surface module connecting the conductor bundle with surface recording equipment permit continuous adjustment of the core pressure as the formation or reservoir heats and cools.

In a further aspect, a plurality of modules contain affixed geophones for acoustic recording, resistance temperature devices (RTDs) for monitoring formation temperature and transducers for monitoring external formation pressure and internal core pressure. A plurality of electrical, optical or other conductor pairs can be used to connect the geophones, RTDs and transducers to the surface of the earth by way of passage through the conduit sections and the modules. The conductor pairs are bundled together with a braided or extruded covering and freely suspended within the conduit and modules so that there are no internal stresses applied to the conductors during compression or expansion of the conduit sections. The covering serves as a stress member under tension, protects the conductors from damage during construction and handling of the cable, and aids the free movement of the conductor bundle within the conduit.

In a further aspect, the conductor bundle is affixed by a rotating clamp in the lower end of each module's pressure housing as it passes through such module to provide support for the weight of the conductor bundle between adjacent modules. A space is provided in the upper end of each module's pressure housing for storing the freely-suspended conductor bundle from the adjacent upper module and conduit during compression of the adjacent upper conduit. Sufficient extra conductor is coiled in this space during manufacturing to also allow for expansion of the conduit sections and to permit opening the plurality of modules for inspection, modification or repair.

In still a further aspect, the outer interlock wall of the conduit is tightly covered with a braided material to provide strength for the conduit sections under torque and tension. The ability of the braided stress member to support large external forces allows the conduit to sustain thousands of pounds of tension without damage and provides for module and geophone alignment by preventing the cable from twisting during manufacturing and deployment in retrievable installations. An outer protective sheath is applied over the braided material to resist abrasion and control corrosion of any associated subsurface carbon steel assemblies such as the borehole's casing. Integrating the sheath with the braided stress member and the outer interlock wall produces a composite outer wall that forms a sealed annulus around the inner core. The sealed annulus can be injected with temperature resistant epoxies, urethanes, silicon rubber, or temperature resistant synthetic oils and greases to provide added conduit strength and corrosion protection for the inner core.

DESCRIPTION OF THE PREFERRED EMBODIMENT

Figure 1:
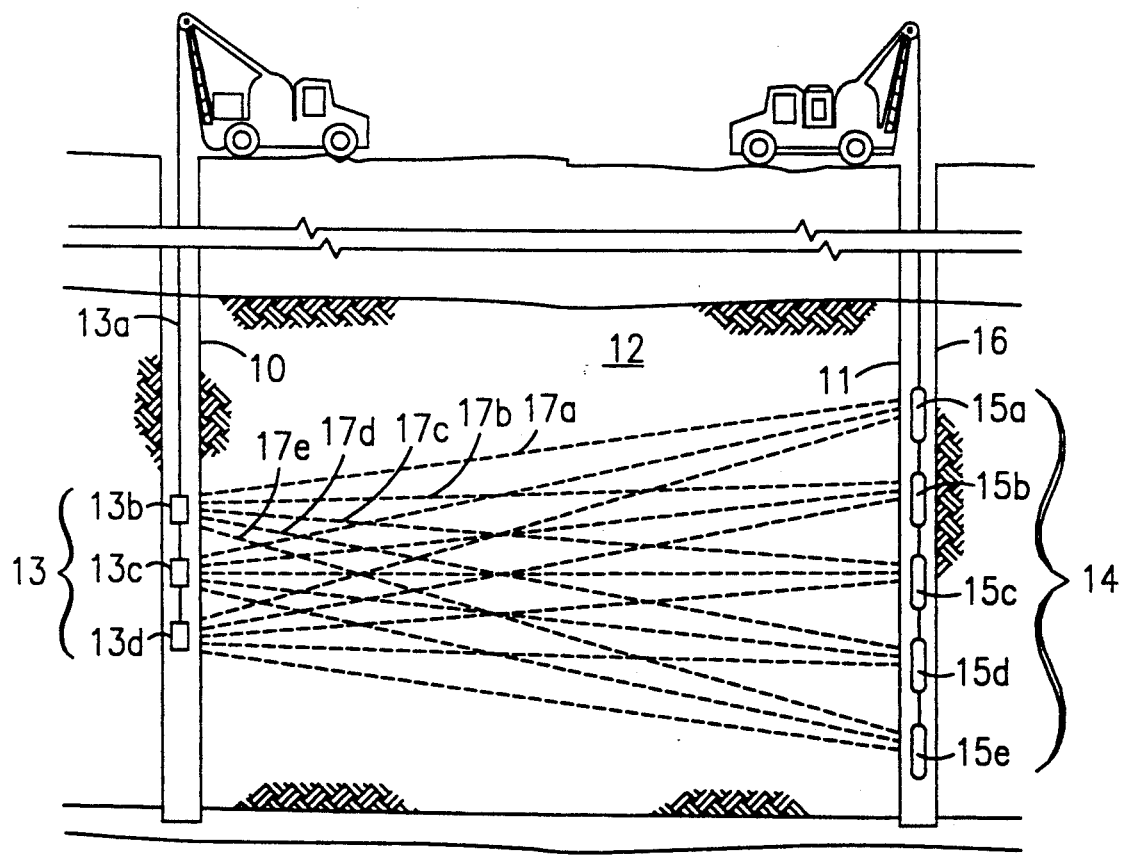
FIG. 1 is a sectional view illustrating a downhole seismic survey being carried out between a source borehole and a receiving borehole.

Before describing the borehole geophone cable of the present invention, there will first be described a tomographic borehole survey with which this cable may be utilized. Referring now to FIG. 1, there is illustrated the formation 12 between source borehole 10 and one or more receiver boreholes 11 (only one shown) which are spaced several hundred feet from borehole 10. One or more sources (e.g. three 13b-13d) are suspended from cable 13a and are precisely positioned within borehole 10.

A borehole geophone cable 14 comprised of a plurality of spaced-apart receivers (e.g. multi-component geophone modules, with only 15a-15e shown for clarity) is precisely positioned in borehole 11. The source or sources are "fired", usually simultaneously to act as a point source, and the acoustical energy is propagated through formation 12 along "travel paths" (only 17a-17e being shown for clarity) where it is recorded by the plurality of receivers. The sources are then repositioned at different depths within borehole 10 and the operation is repeated until sufficient sampling of formation 12 is obtained to provide a tomogram. Detailed formation temperature and pressure data, required for the interpretation of the acoustic data, is recorded by the borehole cable during the seismic survey. Internal cable pressure can also be recorded as needed.

Figure 2:
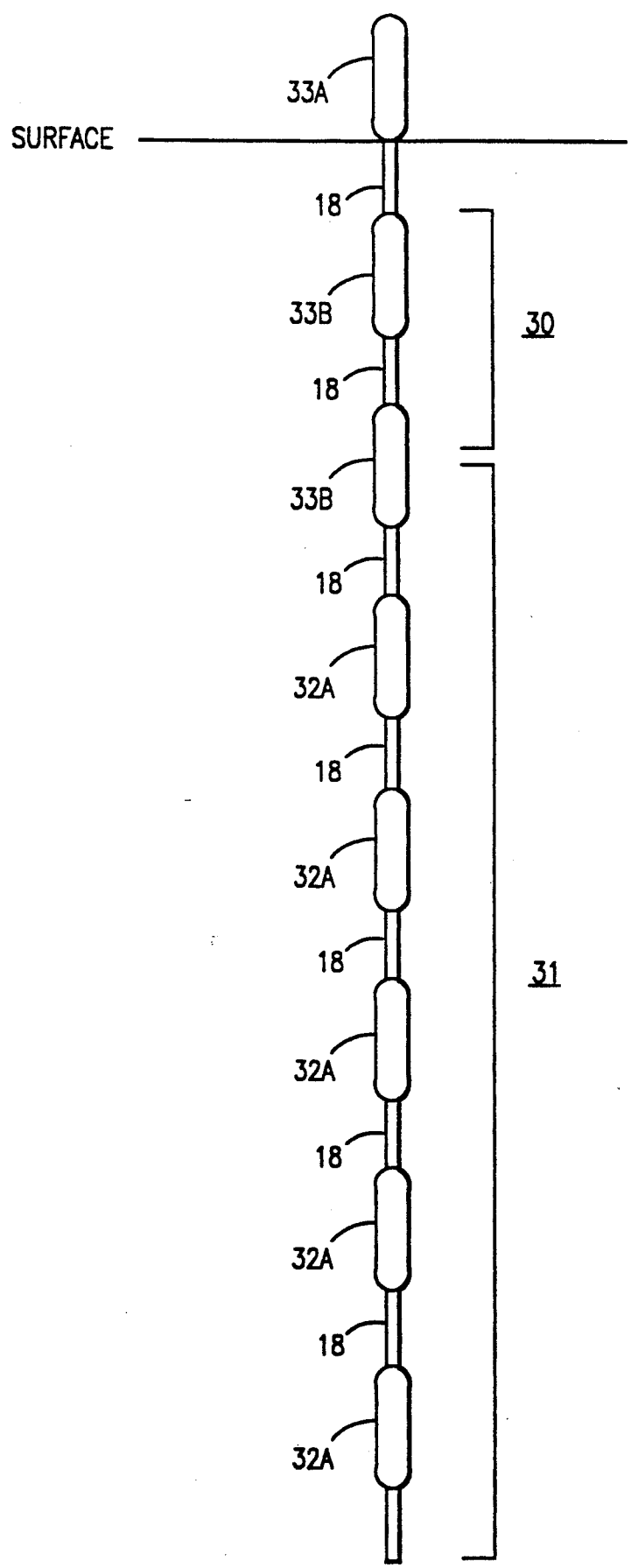
FIG. 2 is a pictorial schematic of an in-line borehole cable as shown in of FIG. 1.

Referring now to FIG. 2, a plurality of cable conduits 18 are used to connect each of the plurality of modules 32A, 33A and 33B of the borehole cable. In one embodiment the lower portion 31 of the borehole cable contains a plurality of geophone modules 32A. These modules contain three or more geophones for multi-component seismic recording, RTDs for formation temperature recording, transducers and valving for monitoring and controlling the internal cable core pressure, transducers for recording the external formation pressure and facilities for freely suspending and storing the internal conductor bundle. The internal conductors, composed of twisted wire pairs or other transmission line/interfaces, lead from each geophone, RTD and transducer in the module and connect to surface recording equipment. The specifications of the geophones, RTDs and transducers depend on the reservoir temperature and pressure and the imaging requirements of the survey.

The upper portion 30 of the borehole cable, connecting the lower portion 31 of the cable to the surface, contains a plurality of modules 33B which freely suspend the internal conductors and allow for expansion and contraction of the conductors and the cable conduit as the formation heats and cools during the fluid recovery process. Spacing of the modules 33B is determined by the length of the conduit sections 18. At the surface, a special module 33A provides leads to connect the internal conductors to surface recording equipment. Valving in the surface module 33A permit the inner core of the cable to be flushed with inert gases, or charged with various high temperature resistant fluids such as oil to counter the externally applied formation pressure. This valving is used to regulate the internal core pressure which also changes as the formation heats and cools.

Figure 3:
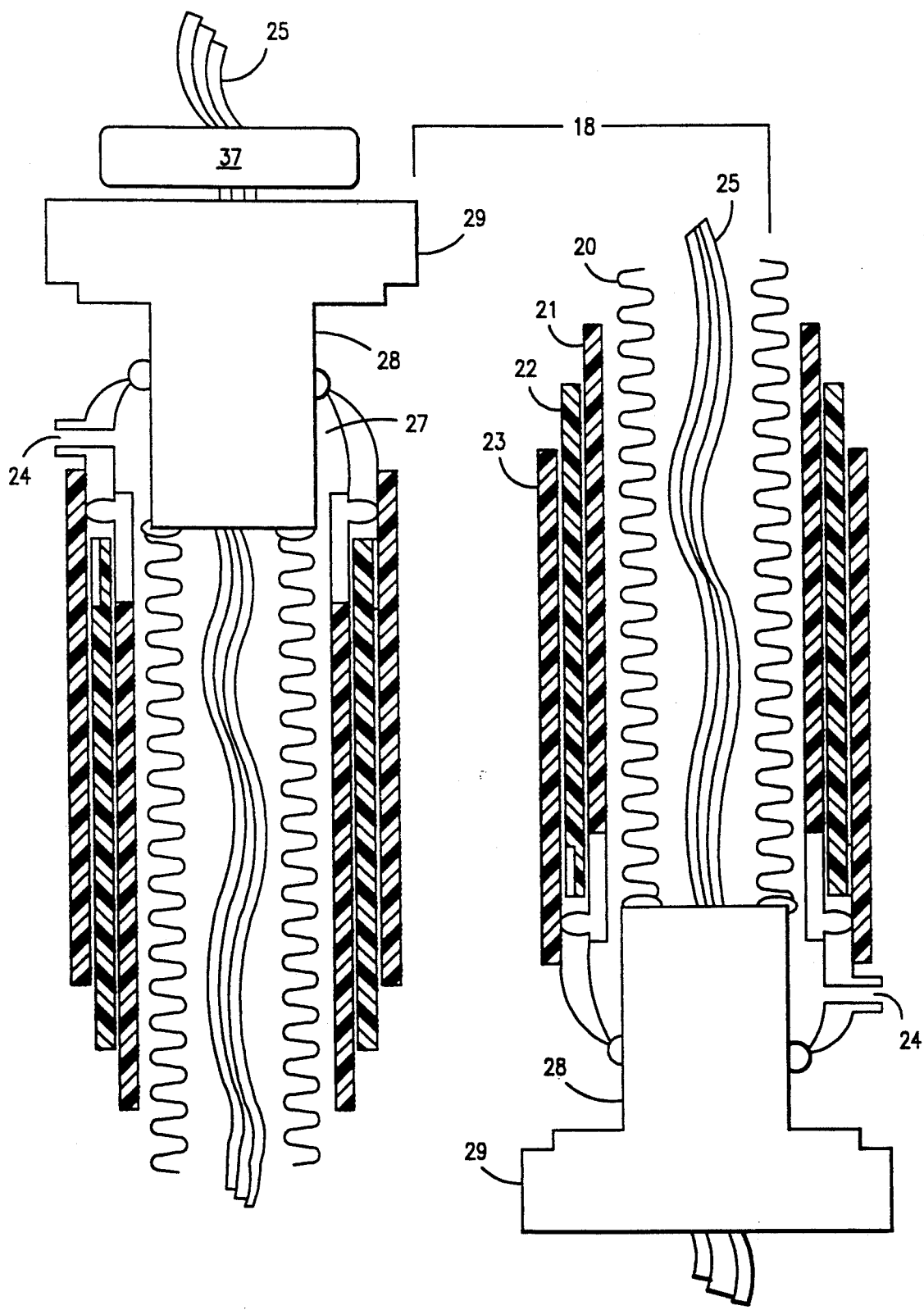
FIG. 3 is a pictorial schematic of the cable conduit and end fittings designed to connect the primary and ancillary cable modules as illustrated in FIG. 2 and FIG. 7.
Figure 7:
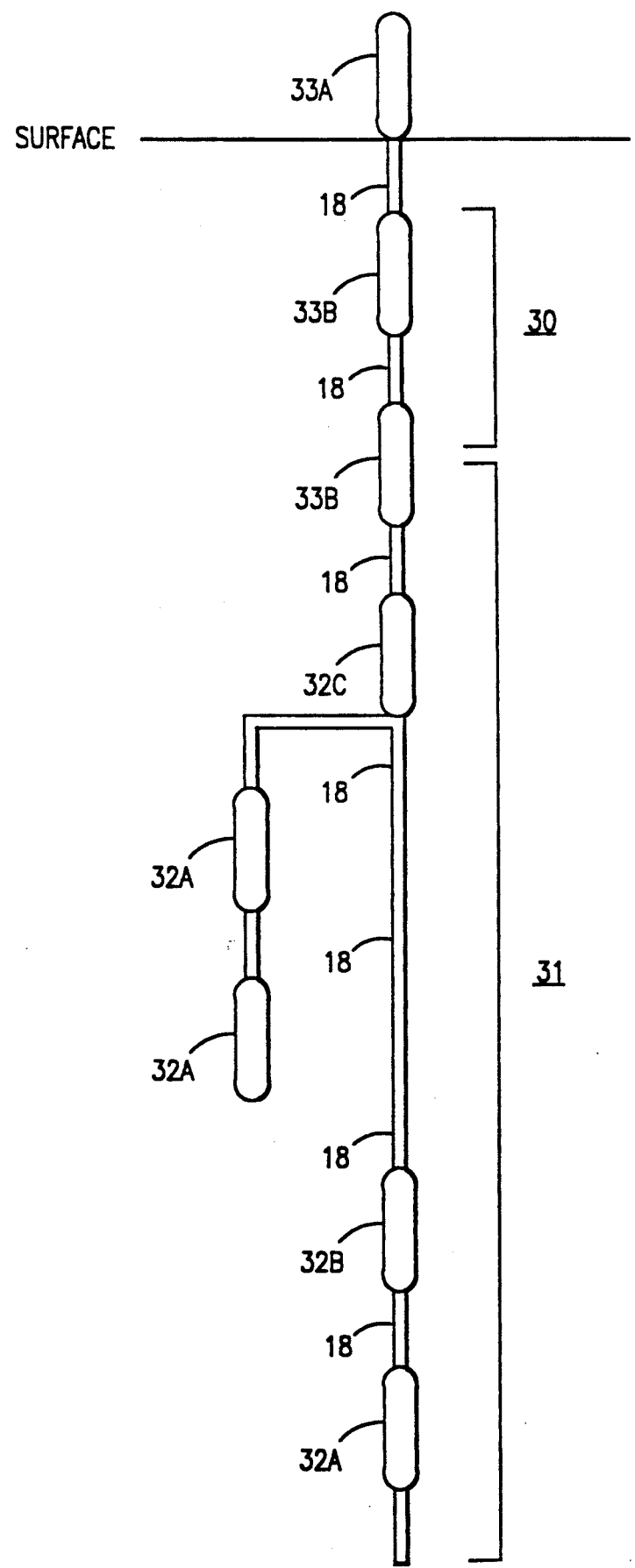
FIG. 7 is a pictorial schematic of the borehole cable of FIG. 3 constructed in multiple in-line and off-line segments for improved shipping and deployment in deep installations.

Referring now to FIG. 3, the plurality of modules of type 32A, 32B, 33A and 33B of FIGS. 2 and 7 are spaced-apart by the plurality of cable conduits 18. Such cable conduit is composed of a flexible inner core 20, a flexible outer interlock wall 21, a braided stress member 22, a protective covering 23 and ancillary end fittings and seals 29 to connect with the modules. The different layers used in the conduit form a flexible, hollow assembly that is extremely strong under both compression and tension, and capable of withstanding both large external and internal pressures and fluctuations in pressure.

Inner core 20 is a flexible tubing formed from corrosion resistant metals, high temperature resistant fiber reinforced plastics or synthetic materials such as "TEFLON", depending on the installation requirements. As indicated in the figure, the inner core can be formed with pre-compressed or pre-molded corrugations for increased strength and flexibility. The purpose of the inner core is to isolate the internal geophone, RTD and transducer conductors from reservoir fluids and pressure. In one embodiment, the inner core 20 is filled with inert gases, providing a stable, low pressure environment for the internal conductors and materials. In another embodiment, the inner core 20 is filled with high temperature resistant fluids such as oil to counter high reservoir pressures.

Outer wall 21 is comprised of a strong, flexible interlock resistant to compression. The interlock is compressed when the inner core compresses under reservoir conditions into a rigid tube without a significant change in radial dimensions. Materials suitable for the outer wall include corrosion resistant metals, fiber reinforced composites, ceramics and plastics or synthetic materials. Along with controlling the compression of the cable conduit, the interlock provides crush protection for the inner core during handling and deployment of the cable.

The outer wall 21 is completely surrounded by a braided covering 22 that provides great strength against any tension 10 and torque applied to the conduit 18. The braided stress member is then completely surrounded by a protective sheath 23 that acts as an outer corrosion and abrasion covering. Materials suitable for the braided covering 22 include corrosion resistant metals, glass and carbon fibers, and synthetic fibers such as "KELVAR". Materials suitable for the corrosion and abrasion covering 23 include high temperature extrusions and heat shrinks made from synthetics such as "NEOPRENE", "TEFLON" and "VITON". Depending on the installation, 21, 22 and 23 can be integrated into a single protective outer wall.

An annulus 27 is formed between the inner core 20 and the outer interlock 21, and sealed by the protective coverings 22 and 23 and the circular fitting containing the threaded injection ports 24. The ports 24 at each end of the conduit allow materials to be injected into the annulus to provide additional strength or corrosion protection for the conduit. For example, high temperature epoxies and urethanes can be injected into the annulus during deployment to create an extremely strong and rigid composites structure. Alternately, high temperature greases or silicon rubbers can be injected before or during deployment to provide increased corrosion protection. Since the annulus 27 is sealed by both the inner core 20 and the outer covering 23, a vacuum can be applied to the ports 24 to improve injection.

The flange nipple 28 joins the inner core 20 with the conduit 18 flange or flare end fitting 29, and allows the outer interlock wall 21 to be pre-compressed during manufacturing.

Figure 4:
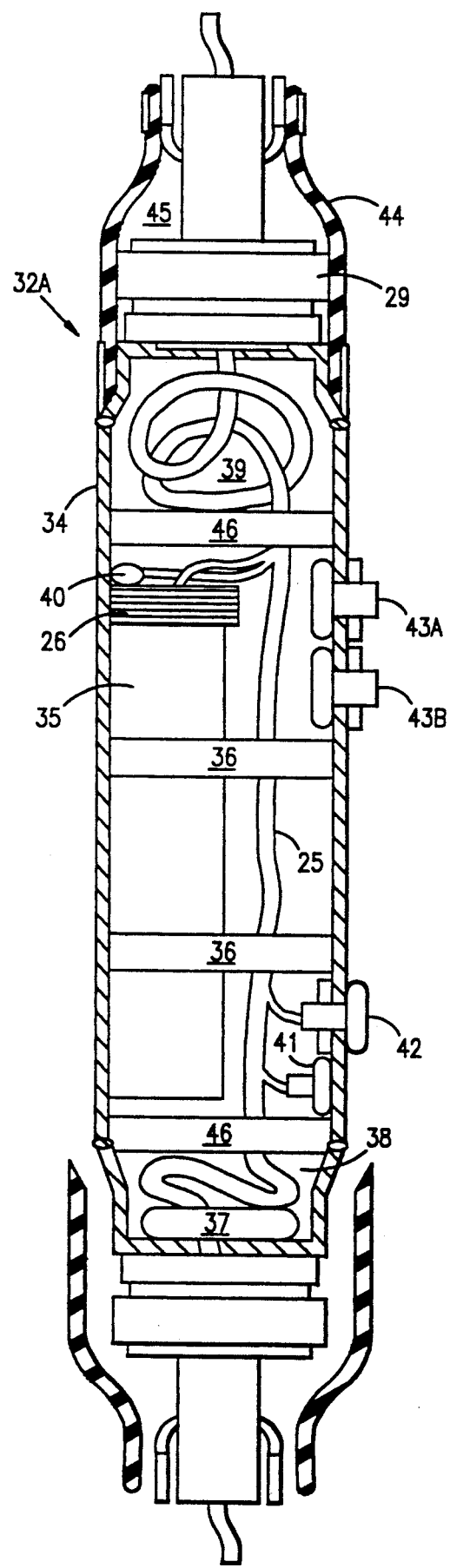
FIG. 4 is a pictorial schematic of a primary data sensing module containing three or more geophones, a single RTD and internal and external pressure transducers designed for acquiring acoustic, thermal and pressure data.

Referring now to FIG. 4, there is shown a geophone module 32A consisting of a pressure housing 34 that forms the outer structural wall of the module 32A. Pressure housing 34 is machined in three pieces and then joined into one piece during manufacturing to minimize the number of seals required for construction of the cable. A single, rotating flange or flare fitting 29, usually formed from the same material as the pressure housing 34, is used at each end of the housing for inserting the geophone canisters 35 and retainers 36, module temperature RTD 40, internal core pressure transducer 41, external formation pressure transducer 42, inner core fluid valves 43A and 43B and completing pressure housing conductor connections 26. The flange or flare seals 29 rotate so that all of the modules 32A can be aligned during cable assembly, thus aligning all of the geophones throughout the cable.

Three or more geophones are mounted in the cannisters 35 at precise orientations for multi-component recording. The sealed cannisters 35 are capable of withstanding high pressure and temperature and have feedthroughs for their pressure housing conductors 26. The canisters 35 are mechanically locked into the pressure housings with retainers 36, which are inserted into the pressure housings 34 before it is joined into one piece. Materials suitable for the pressure housings 34 include corrosion resistant metals, plastics, fiber reinforced composites, glass and ceramics. Materials suitable for the cannisters and the canister locks are similar, having equal or slightly greater rates of thermal expansion.

The geophone, RTD and transducer conductor bundle 25 is affixed with rotating, floating clamps 37 in the lower portion 38 of the pressure housing 34, supporting the free-floating weight of the conductor 25 between adjacent geophone modules. Sufficient length of conductor 25 is stored in the upper end 39 of the pressure housing 34 after assembly of the module 32A to permit entry into the module for inspection or maintenance of the internal parts, or to accommodate expansion of the conduit. The upper portion 39 of the pressure housing 34 provides space for storing conductor 25 during contraction of the conduit at deployment.

Figure 5:
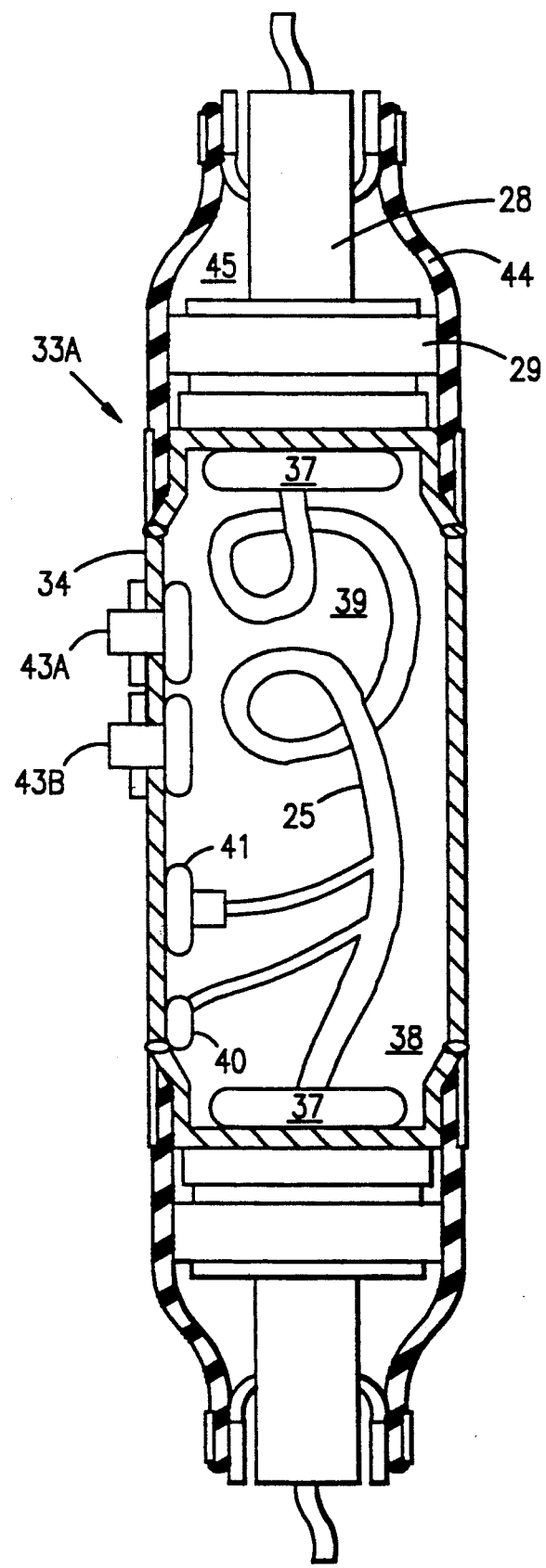
FIG. 5 is a pictorial schematic of the ancillary surface module designed to monitor and adjust internal core pressure.

Inner core fluid valves 43A and 43B, used to charge the inner core of the modules 32A and the associated conduit with fluids, also function as safety devices capable of reducing internal core pressure in the module 32A if it reaches a predetermined limit as monitored by the internal core pressure transducer 41. (Normally the core pressure would be adjusted at the surface as indicated in FIG. 5.) Valves 43A and 43B are also required for leak testing the cable during assembly.

Rubber boot 4 provides increased protection for the end seals 29 during transportation and deployment, and provides a secondary high pressure seal at the ends of the pressure housing 34 and the conduit. The space between the boot 44 and the flange or flare end fittings 29 is filled with high temperature resistant potting material 45 to prevent the boot 44 from being damaged during compression against the end seals 29.

Damping material 46 is used to "quiet" the conductor bundle 25, minimizing noise on the seismic records due to motion within the pressure housing 34.

Referring to FIG. 5, module 33A is a surface module that controls core pressure and provides external leads to connect the inner conductor 25 to the surface recording facilities. In this module, the conductor bundle 25 is retained by rotating clamps 37 at both flange or flare end fittings 29. Module 33A contains an internal core pressure transducer 41 to monitor internal pressures at the surface, and core pressure is regulated using the pressure housing valves 43A and 43B.

Figure 6:
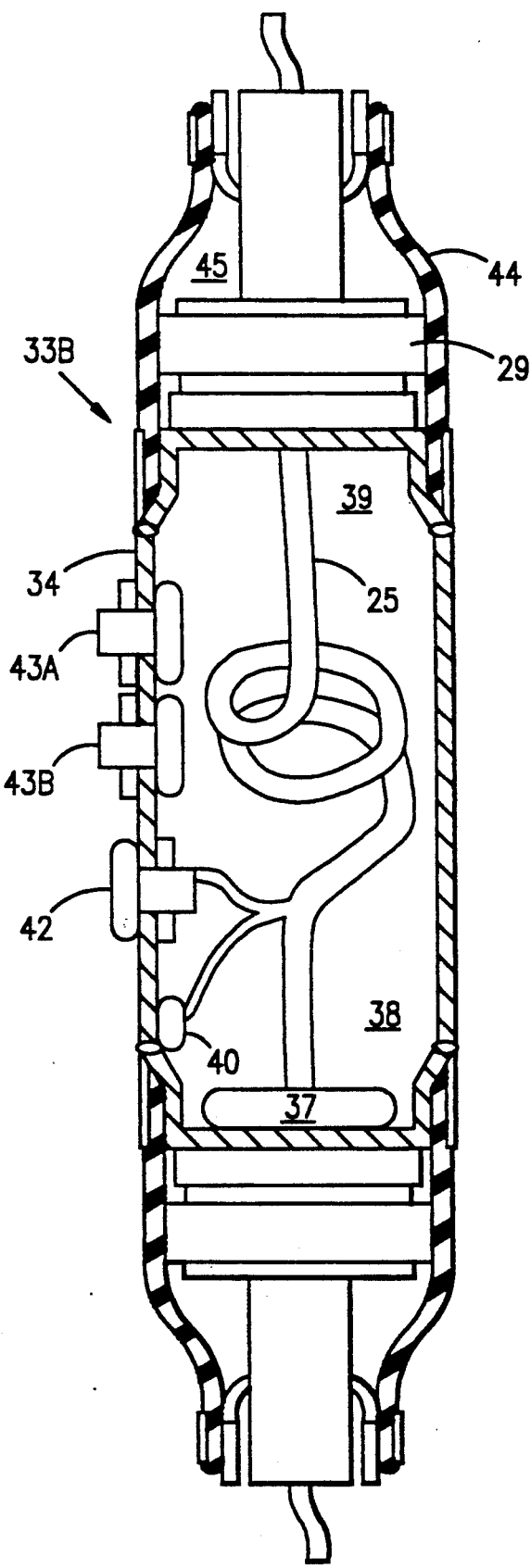
FIG. 6 is a pictorial schematic of an ancillary module designed to allow for expansion and contraction of the cable conduit connecting the primary data sensing modules to the surface facilities.

Referring to FIG. 6, module 33B is used to connect the geophone-containing modules 32A to the surface. This module supports the weight of the internal conductor bundle 25 with rotating clamp 37 and provides storage space 39 for the conductor 25 allowing for expansion and contraction of the conduit sections. The pressure housing 34 can be equipped with an RTD 40 and pressure valves 43A and 43B as needed.

Figure 8:
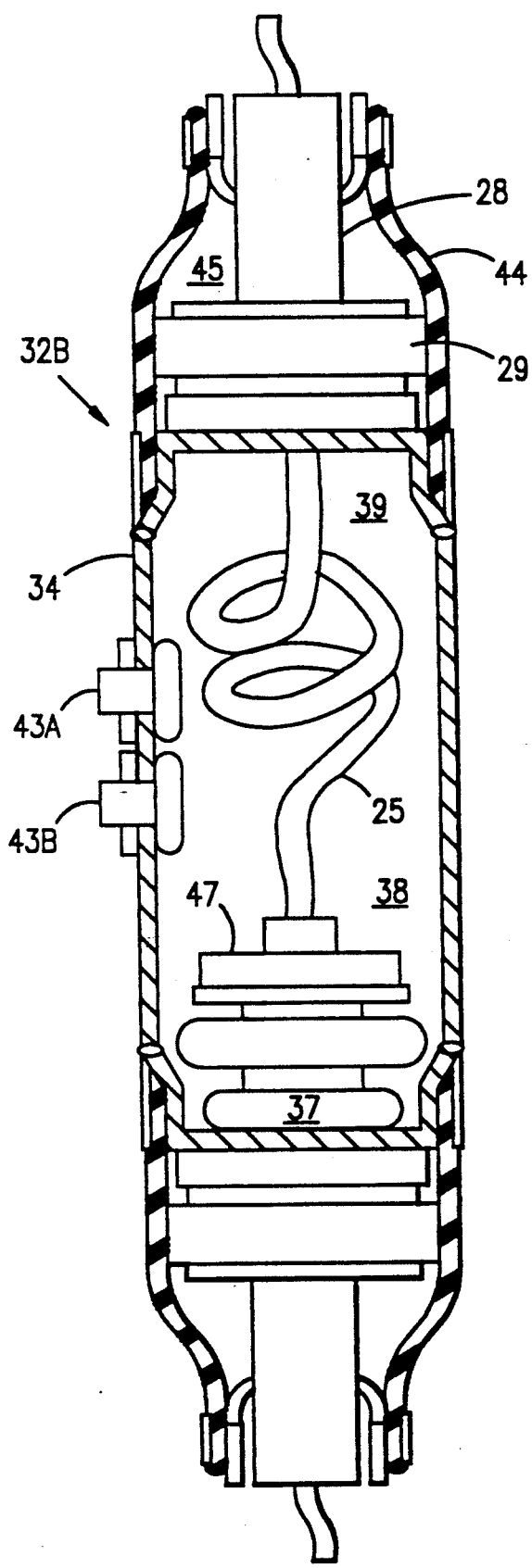
FIG. 8 is a pictorial schematic of an ancillary module designed with a single plug connector so that the cable can be constructed in multiple in-line segments.
Figure 9:
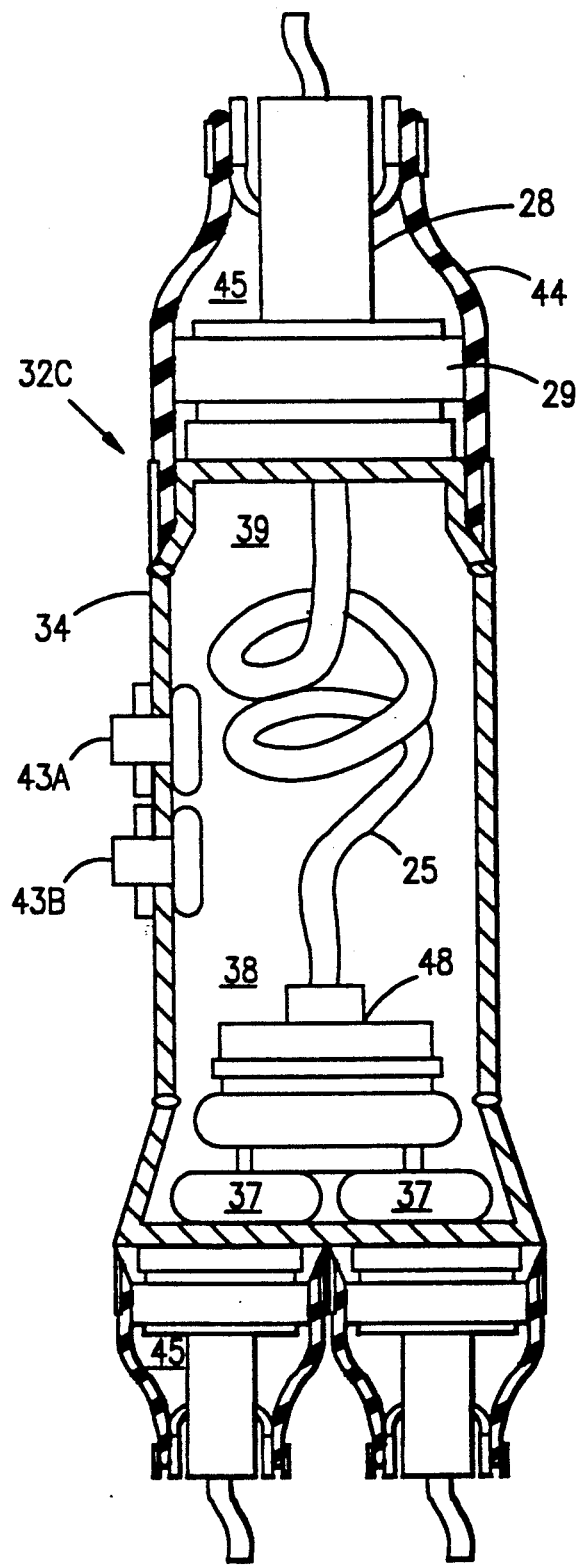
FIG. 9 is a pictorial schematic of an ancillary module designed with primary and secondary plug connectors so that the cable can be constructed with multiple off-line segments.

Referring to FIG. 7, the geophone cable can be constructed in one section or multiple in-line and off-line sections. The lower, geophone-containing portion of the cable 31 shows module 32B being used to connect an in-line section and module 32C being used to connect both an off-line section and an in-line section. Referring to FIG. 8, module 32B connects an in-line section through a single internal conductor plug 47. Referring to FIG. 9, module 32C connects both in-line and off-line sections through multiple internal conductor plugs 48.

Having now described the present invention in conjunction with a preferred embodiment, it is to be understood that various modifications or changes may be made without departing from the spirit and scope of the invention as set forth in the appended claims.

We claim:

1. A borehole cable, comprising:
   a) a plurality of modules,
   b) a plurality of cable conduits interconnecting said modules at spaced-apart positions to form said borehole cable, said cable conduits being capable of contraction and expansion due to external pressure and temperature changes during borehole operations, each of said conduits comprising:
      i) an inner core of flexible, corrugated tubing which compresses longitudinally under continuous external pressure applied by a subsurface formation surrounding a borehole in which said cable is deployed, and
      ii) an outer wall of interlock completely surrounding said inner core, which is flexible under atmospheric pressure on the surface of the earth and compresses longitudinally without change in radial dimension along with the longitudinal compression of said inner core under the continuous external pressure applied by said subsurface formation to lock and form a rigid outer cable wall to prevent any further compression of said inner core during cable deployment in said borehole.

2. The borehole of claim 1 further comprising a plurality of resistance temperature device (RTDs) in the modules to record formation temperature.

3. The borehole cable of claim 1 further comprising a plurality of pressure transducers in the modules to record the formation pressure.

4. The borehole of claim 1 further comprising a plurality of pressure transducers in the modules to monitor internal cable core pressure.

5. The borehole cable of claim 1 further comprising a surface module for regulating internal cable core pressure.

6. The borehole cable of claim 5 further comprising a pressure transducer in the surface module for monitoring internal surface module pressure.

7. The borehole cable of claim 5 further comprising a plurality of cable modules for suspending said borehole cable and allowing for compression on contraction of said borehole cable by freely suspending and storing internal cable conductors.

8. The borehole cable of claim 7 further comprising a plurality of connecting modules for assembling and transporting a geophone portion of said borehole cable in sections.

9. The borehole cable of claim 1 further comprising an annulus formed between said inner core and outer wall and at least one injection port communicating with said annulus through which fluid is injected during cable deployment to provide a degree of rigidity to said borehole cable.

10. The borehole cable of claim 9 wherein said inner core is filled with fluid to apply a counter pressure to formation pressure on said borehole cable.

11. The borehole cable of claim 1 further comprising a stress covering surrounding said outer wall providing stress support under torque and tension to strengthen said borehole cable prior to deployment and compression in said borehole.

12. The borehole cable of claim 11 wherein said stress covering is a braided corrosion resistant metal.

13. The borehole cable of claim 11 wherein said stress covering is a braided synthetic fiber material.

14. The borehole cable of claim 11 further comprising an outer protective covering surrounding said stress covering to provide for abrasion and corrosion protection.

15. The borehole cable of claim 14 wherein said outer protective covering is a high temperature heat extruded material.

16. The borehole cable of claim 14 wherein said outer protective covering is a heat shrink material.

17. The borehole cable of claim 1 wherein at least some of said plurality of modules are geophone-containing modules.

18. The borehole cable of claim 17 further comprising:
   a) a plurality of geophones, at least three of which are affixed within each of said geophone modules,
   b) a plurality of conductor pairs, one of such conductor pairs electrically connecting each of said plurality of geophones to the surface of the earth by way of passage through said modules and said cable conduits,
   c) a plurality of resistance temperature devices, at least one of which is affixed within each of said geophone modules,
   d) a plurality of conductor pairs, two of such conductor pairs electrically connecting each of said plurality of resistance temperature devices to the surface of the earth by way of passage through said modules and said cable conduits,
   e) a plurality of pressure transducers, at least one of which is affixed within each of said geophone modules to monitor internal core pressure,
   f) a plurality of conductor pairs, one of such conductor pairs electrically connecting each of said plurality of pressure transducers to the surface of the earth by way of passage through said modules and said cable conduits,
   g) a plurality of pressure transducers, at least one of which is affixed within each of said geophone modules to record external formation pressure,
   h) a plurality of conductor pairs, one of such conductor pairs electrically connecting each of said plurality of pressure transducers to the surface of the earth by way of passage through said modules and said cable conduits,
   i) rotating means for affixing said conductors pairs within a first end of each geophone-containing module as they pass through said geophone-containing module to provide support for the weight of said conductor pairs between adjacent modules along said borehole cable and thereby allow for the free suspension of said conductor pairs between adjacent modules, and
   j) a space provided in a second end of said modules for storing an extra length of said freely-suspended conductor pairs to allow for an increase in borehole cable length due to expansion of said cable conduits, for collecting an extra length of said freely-suspended conductor pairs to allow for a decrease in borehole cable length during contraction of said cable, and for entry into the modules for repair.

19. The borehole cable of claim 1 wherein said inner core is comprised of compressed corrosion-resistant metal.

20. The borehole cable of claim 1 wherein said inner core is comprised of fiber-reinforced composites.

21. The borehole cable of claim 1 wherein said inner core is comprised of synthetic material.

22. The borehole cable of claim 1 wherein said inner core is comprised of plastic.

23. The borehole cable of claim 1 wherein said outer wall is comprised of corrosion-resistant metal.

24. The borehole cable of claim 1 wherein said outer wall is comprised of fiber-reinforced composites.

25. The borehole cable of claim 1 wherein said outer wall is comprised of ceramics.

26. The borehole cable of claim 1 wherein said outer wall is comprised of synthetic material.

27. The borehole cable of claim 1 wherein said outer wall is comprised of plastic.

28. A borehole geophone cable, comprising:
a) a plurality of geophone modules and cable modules,
b) a plurality of cable conduits interconnecting said geophone modules at spaced-apart positions along a lower portion of said borehole cable and interconnecting said cable modules at spaced-apart positions along an upper portion of said borehole cable, said cable conduits, being capable of contraction and expansion due to external pressure and temperature changes during borehole operations, each said cable conduits comprising:
   i) an inner core of flexible, corrugated tubing which compresses longitudinally under continuous external pressure applied by a subsurface formation surrounding a borehole in which said cable is deployed, and
   ii) an outer wall of interlock completely surrounding said inner core, which is flexible under atmospheric pressure on the surface of the earth and compresses longitudinally without change in radial dimension along with the longitudinal compression of said inner core under the continuous external pressure applied by said subsurface formation to lock and form a rigid outer cable wall to prevent any further compression of said inner core during cable deployment in said borehole,
c) a plurality of geophones, at least three or more of which are positioned within each of said geophone modules,
d) a plurality of conductor pairs electrically connecting said plurality of geophones to the surface of the earth by way of passage through said plurality of cable conduits,
e) rotating means for affixing said conductors pairs within a first end of each geophone-containing module as they pass through said geophone-containing module to provide support for the weight of said conductor pairs between adjacent modules along said borehole cable and thereby allow for the free suspension of said conductor pairs between adjacent modules, and
f) a space provided in a second end of said modules for storing an extra length of said freely-suspended conductor pairs to allow for an increase in borehole cable length due to expansion of said cable conduits, for collecting an extra length of said freely-suspended conductor pairs to allow for a decrease in borehole cable length during contraction of said cable, and for entry into the modules for repair.

29. The borehole cable of claim 28 further comprising a stress covering surrounding said outer wall providing stress support under torque and tension to strengthen said borehole cable prior to deployment and compression within said borehole.

30. The borehole cable of claim 29 wherein said stream covering is a braided corrosion resistant metal.

31. The borehole cable of claim 29 wherein the said stress covering is a braided synthetic fiber material.

32. The borehole cable of claim 29 further comprising an outer protective covering surrounding said stress covering to provide for abrasion and corrosion protection.

33. The borehole cable of claim 32 wherein said outer protective covering is a high temperature heat extruded material.

34. The borehole cable of claim 33 wherein said outer protective covering is a heat shrink material.

* * * * *